US011507479B2

(12) United States Patent
Kumar et al.

(10) Patent No.: US 11,507,479 B2
(45) Date of Patent: Nov. 22, 2022

(54) HIGH AVAILABILITY FOR A RELATIONAL DATABASE MANAGEMENT SYSTEM AS A SERVICE IN A CLOUD PLATFORM

(71) Applicant: SAP SE, Walldorf (DE)

(72) Inventors: Dinesh Kumar, Bangalore (IN); Shashank Mohan Jain, Karnataka (IN); Subhro Bhattacharyya, Durgapur (IN)

(73) Assignee: SAP SE, Walldorf (DE)

( * ) Notice: Subject to any disclaimer, the term of this patent is extended or adjusted under 35 U.S.C. 154(b) by 507 days.

(21) Appl. No.: 16/581,956

(22) Filed: Sep. 25, 2019

(65) Prior Publication Data

US 2021/0089415 A1 Mar. 25, 2021

(51) Int. Cl.
*G06F 11/20* (2006.01)
*G06F 9/455* (2018.01)
*G06F 16/25* (2019.01)
*G06F 11/07* (2006.01)
*H04L 67/1001* (2022.01)

(52) U.S. Cl.
CPC ...... *G06F 11/2023* (2013.01); *G06F 9/45558* (2013.01); *G06F 16/252* (2019.01); *G06F 11/0772* (2013.01); *G06F 2009/4557* (2013.01); *G06F 2009/45595* (2013.01); *G06F 2201/80* (2013.01); *H04L 67/1001* (2022.05)

(58) Field of Classification Search
CPC ............ G06F 11/0772; G06F 11/2023; G06F 11/2028; G06F 11/2038; G06F 11/2048; G06F 9/45558; G06F 2009/4557; G06F 2009/45595; H04L 67/1002
See application file for complete search history.

(56) References Cited

U.S. PATENT DOCUMENTS

| | | | | |
|---|---|---|---|---|
| 9,626,262 B1 * | 4/2017 | Vogel | ................... | G06F 11/2028 |
| 10,812,366 B1 * | 10/2020 | Berenberg | .......... | H04L 41/0895 |
| 11,082,338 B1 * | 8/2021 | Saha | ....................... | H04L 43/10 |
| 2003/0154236 A1 * | 8/2003 | Dar | ..................... | H04L 67/1025 |
| | | | | 709/201 |

(Continued)

FOREIGN PATENT DOCUMENTS

CA 2778456 A1 * 5/2011 .......... G06F 11/1443

*Primary Examiner* — Joseph O Schell
(74) *Attorney, Agent, or Firm* — Buckley, Maschoff & Talwalkar LLC

(57) ABSTRACT

A Relational Database Management System ("RDBMS") as a service cluster may including a master RDBMS Virtual Machine ("VM") node associated with an Internet Protocol ("IP") address and a standby RDBMS VM node associated with an IP address. The RDBMS as a service (e.g., PostgreSQL as a service) may also include n controller VM nodes each associated with an IP address. An internal load balancer may receive requests from cloud applications and include a frontend IP address different than the RDBMS IP as a service addresses and a backend pool including indications of the master RDBMS VM node and the standby RDBMS VM node. A Hyper-Text Transfer Protocol ("HTTP") custom probe may transmit requests for the health of the master RDBMS VM node and the standby RDBMS VM node via the associated IP addresses, and responses to the requests may be used in connection with a failover operation.

19 Claims, 19 Drawing Sheets

(56) References Cited

U.S. PATENT DOCUMENTS

| | | | |
|---|---|---|---|
| 2006/0047831 A1* | 3/2006 | Piper | H04L 67/1019 709/229 |
| 2013/0275489 A1* | 10/2013 | Jansson | G06F 16/958 709/202 |
| 2015/0150113 A1* | 5/2015 | Robb | H04L 63/0281 726/12 |
| 2015/0249586 A1* | 9/2015 | Byers | H04L 67/1095 709/224 |
| 2017/0269957 A1* | 9/2017 | Kamata | G06F 8/71 |
| 2019/0036986 A1* | 1/2019 | Sathyanarayana | H04L 65/602 |

\* cited by examiner

HIGH AVAILABILITY FOR A RELATIONAL DATABASE MANAGEMENT SYSTEM AS A SERVICE IN A CLOUD PLATFORM

BACKGROUND

An enterprise may utilize applications or services executing in a cloud computing environment. For example, a business might utilize applications that execute at a data center to process purchase orders, human resources tasks, payroll functions, etc. Implementing an application as a service in a cloud computing environment may simplify the design of an application and improve the utilization of resources for that application. In some cases, a Relational Database Management System ("RDBMS") as a service might be provided in such a cloud computing environment. It can be difficult, however, to ensure that such a system can meet high availability standards using traditional approaches.

It would therefore be desirable to provide high availability for a relational database management system as a service in a cloud-based computing environment in a secure, automatic, and accurate manner.

SUMMARY

Methods and systems may be associated with a cloud computing environment. A Relational Database Management System ("RDBMS") as a service cluster may include a master RDBMS Virtual Machine ("VM") node associated with an Internet Protocol ("IP") address and a standby RDBMS VM node associated with an IP address. The RDBMS as a service (e.g., PostgreSQL as a service) may also include n controller VM nodes each associated with an IP address. An internal load balancer may receive requests from cloud applications and include a frontend IP address different than the RDBMS IP as a service addresses and a backend pool including indications of the master RDBMS VM node and the standby RDBMS VM node. A Hyper-Text Transfer Protocol ("HTTP") custom probe may transmit requests for the health of the master RDBMS VM node and the standby RDBMS VM node via the associated IP addresses, and responses to the requests may be used in connection with a failover operation.

Some embodiments comprise: means for establishing a RDBMS as a service cluster, including: (i) a master RDBMS VM node associated with an IP address, (ii) a standby RDBMS VM node associated with an IP address, and (iii) n controller VM nodes each associated with an IP address, where n is greater than 1; means for assigning, for an internal load balancer that receives requests from cloud applications, a frontend IP address different than the RDBMS IP as a service addresses; means for establishing a backend pool including indications of the master RDBMS VM node and the standby RDBMS VM node; and means for implementing a HTTP custom probe to transmit requests for the health of the master RDBMS VM node and the standby RDBMS VM node via the associated IP addresses, wherein responses to the requests are used in connection with a failover operation.

Some technical advantages of some embodiments disclosed herein are improved systems and methods to provide high availability for a relational database management system as a service in a cloud-based computing environment in a secure, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The adoption of cloud applications has substantially increased in recent years. With such an approach, developers do not need to worry about infrastructure or runtimes that are required for an application. Cloud adoption may also result in reduced capital expenditures and maintenance costs while also providing more flexibility and scalability. This in turn increases the importance of Platforms-as-a-Service ("PaaS") products in this space.

PaaS products provide a platform that lets customers develop, run, and manage applications without the complexity of building and maintaining the infrastructure typically associated with developing and launching an application. It can instead be viewed as a product, where the consumer can control software deployment with minimal configuration options, and the provider provides the networks, servers, storage, Operating System ("OS"), middleware (e.g., Java runtime, .NET runtime, integration, etc.), databases and other services to host the consumer's application.

Figure 1:
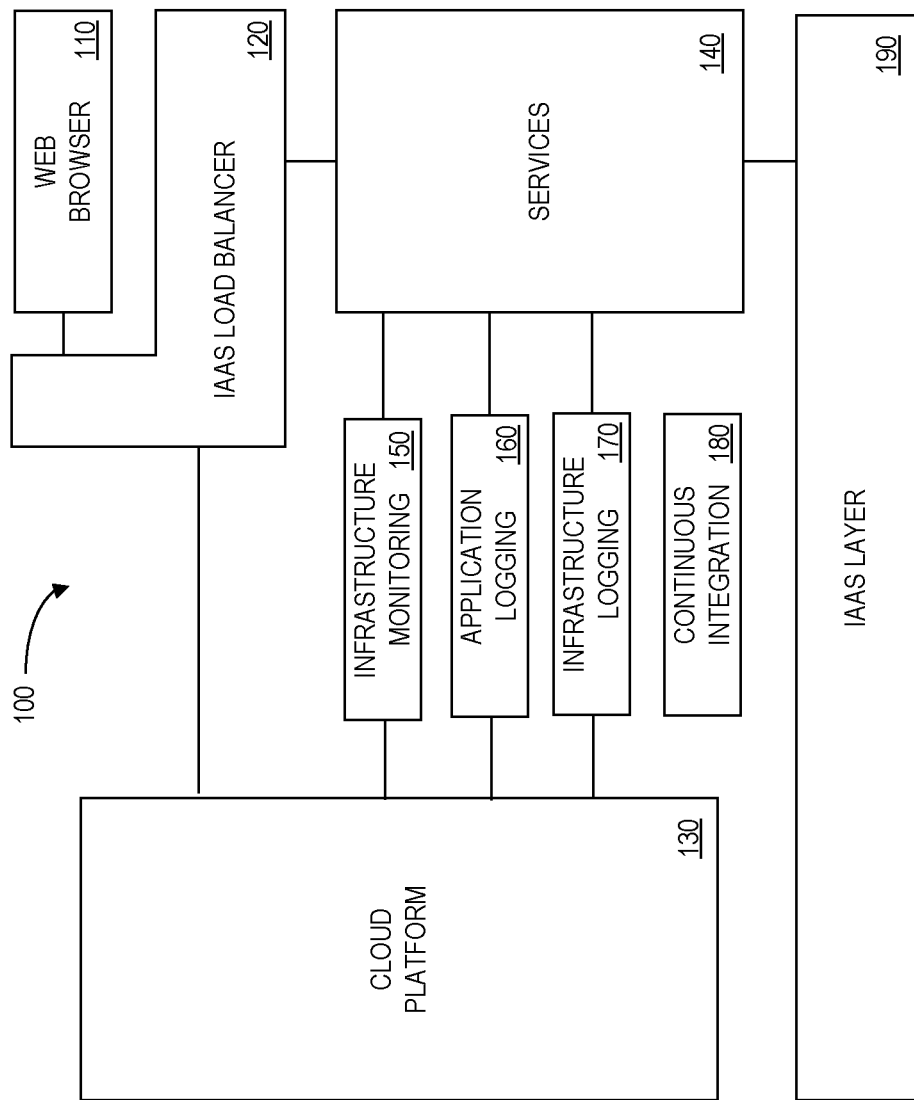
FIG. 1 is a high-level block diagram of cloud computing environment in accordance with some embodiments.

A cloud platform may comprise an open PaaS product that provides core services to build and extend cloud applications on multiple cloud Infrastructure-as-a-Service ("IaaS") providers, such as AWS® from AMAZON®, OpenStack, AZURE® from MICROSOFT®, and the GOOGLE® CLOUD PLATFORM ("GCP"). FIG. 1 is a high-level block diagram of cloud computing environment 100 in accordance with some embodiments. In particular, a customer's web browser 110 may communicate with a cloud platform 130 (e.g., associated with a cloud controller and applications) via an IaaS internal load balancer 720 120. The cloud platform 130 may interact with services 140 (e.g., big data services), and the services 140 may interact with infrastructure monitoring 150, application logging 160, infrastructure logging 170, etc. An IaaS layer 190 (e.g., associated with Virtual Machines ("VMs"), virtual disks, virtual networks, a Domain Name Server ("DNS"), a blob store, time servers, etc.) and continuous integration 180 may also be provided in connection with the cloud computing environment 100. Note that one of the services 140 that may be supported is a Relational Database Management System ("RDBMS") service, such as a Postgre Structured Query Language ("SQL") service.

Figure 2:
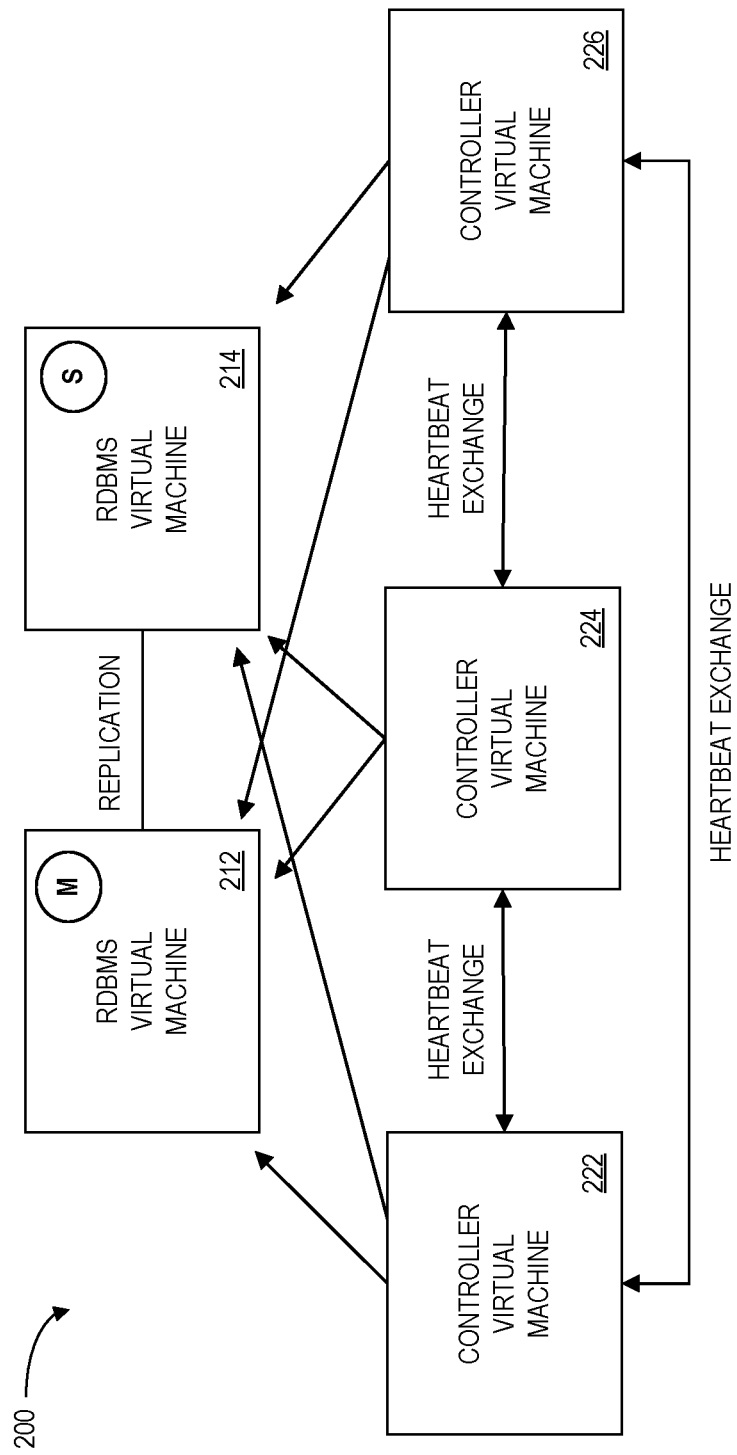
FIG. 2 is a high-level block diagram of an RDBMS-as-a-service in a cloud computing environment according to some embodiments.

FIG. 2 is a high-level block diagram of an RDBMS-as-a-service (e.g., PostgreSQL as a service) system 200 in a cloud computing environment according to some embodiments. The system 200 includes a "master" (or primary) RDBMS VM 212 (illustrated with an "M" in FIG. 2) and a "standby" (sometimes referred to as slave or secondary) RDBMS virtual machine 214 (illustrated with a "S" in FIG. 2). In addition, the system 200 includes three controller VMs 222, 224, 226. Thus, each PostgreSQL as a service instance (or cluster) consists of five VMs: two RDBMS VMs 212, 214 (or PostgreSQL VMs) and three controller virtual machines 222, 224, 226 (e.g., PGPOOL/controller VMs).

According to some embodiments, one PostgreSQL VM 212 runs in "master" mode and may be responsible for serving all the read and write requests made by applications connected to the cluster. A second PostgreSQL VM 214 runs in "standby" mode and replicates the data from the master 212 either in a synchronous or asynchronous way depending on the configuration. At any point in time, the PostgreSQL standby node 214 may act as the fallback/failover node in case of any failure in master node 212. In some embodiments, the PostgreSQL standby node 214 may also be responsible for serving read requests from the applications connected to the cluster (e.g., so that the request load on the master node 212 can be alleviated).

The three controller nodes 222, 224, 226 may comprises controller nodes responsible for managing master and standby nodes 212, 214 in the cluster. A system might make use of software like PGPOOL to achieve a subset of features or the system 200 could be based on custom modules. The controller VMs 222, 224, 226 might be responsible for some or all of the following:

identify the master and standby node 212, 214 in the cluster at any point in time;
identify any failures in the master node 212, achieve consensus among themselves and perform associated operations to failover to the standby node 214;
optionally load balance the requests submitted to the cluster by the connected applications;
identify any replication failures between the master and standby nodes 212, 214 in the cluster;
perform monitoring of PostgreSQL VMs 212, 214 in the cluster and send information to a centralized monitoring server; and/or
identify, log, and upload necessary logs to the centralized server for better debugging capabilities.

In one embodiment, a separate set of three controller nodes 222, 224, 226 are associated with each cluster and is responsible for some or all of the above features. This is done to make sure that any controller node failure does not impact any other cluster. In another embodiment, a pool of controller nodes 222, 224, 226 are created upfront and a random set of three controller nodes are associated with each cluster. These sets of controller nodes might be shared among multiple clusters to reduce the operational costs of VMs.

A cloud platform might manage more than 10,000 PostgreSQL-as-a-Service instances across multiple IaaS entities. An important cloud quality is High Availability ("HA"). Any service with HA qualities may be strictly bound by Service Level Agreements ("SLAs") which can provide stringent guarantees to application users about a service's availability throughout a life span (e.g., PostgreSQL might need to be available 99.99% of the time, no matter what kind of hardware or software disruptions arise). It may therefore be important that any service disruption resulting from a failure in the system be reduced to a minimal time period.

Figure 3:
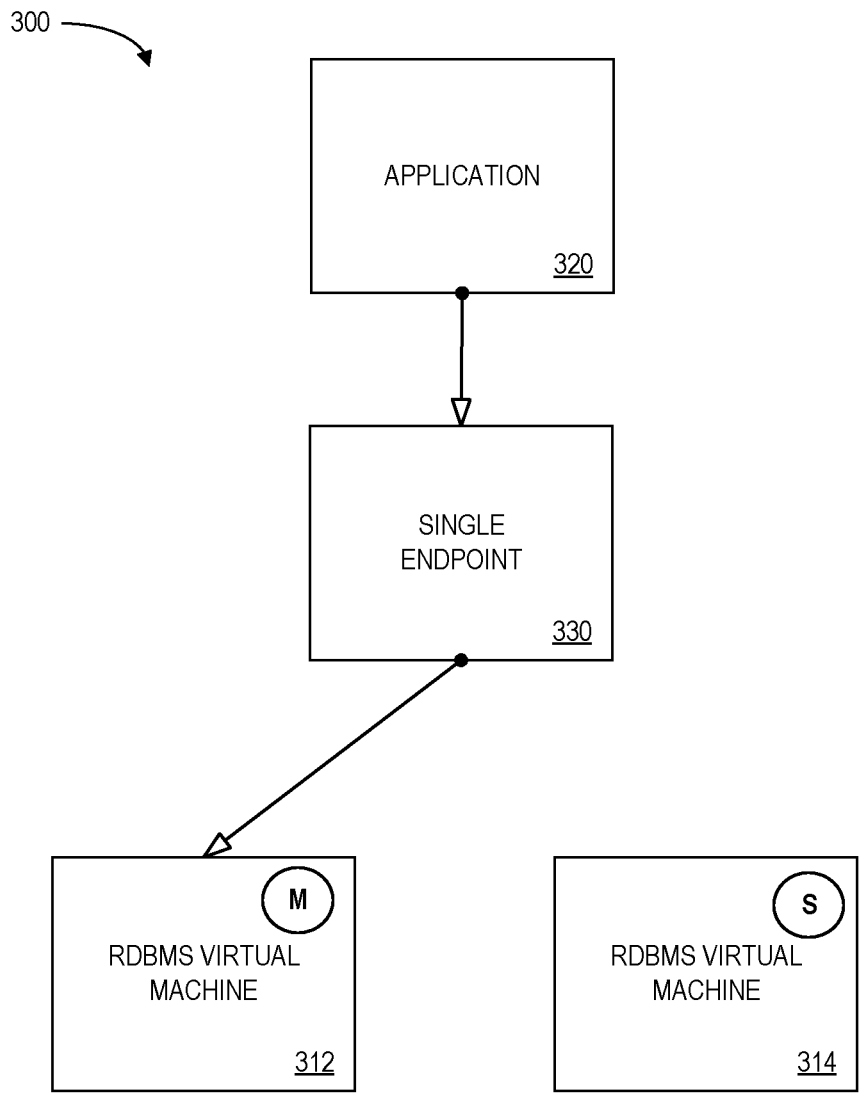
FIG. 3 illustrates an RDBMS-as-a-service with a single endpoint in accordance with some embodiments.

When an application needs to connect to a service, it must determine the information necessary to connect and communicate with the server. This information is known as a "service end-point." The service end-point for a PostgreSQL as a service may comprise: a protocol name, a private Internet Protocol ("IP") address, and a port in which the service has been made available. When a new service instance is created, a unique end-point may be assigned to it which is returned to applications that want to connect to that service. In the case of PostgreSQL as a service, more than one PostgreSQL VM is part of a service instance (cluster). At any point in time (since there is only one master node), the end-point generated should point to the "current" master (or primary) node in that cluster. FIG. 3 illustrates 300 an RDBMS-as-a-service cluster (e.g., having two RDBMS VMs 312, 314) accessed by an application 320 via a single endpoint 330 in accordance with some embodiments. Note that applications that use a service may execute on various different types of runtimes and/or platforms. Moreover, drivers that connect to the service instance might not be able to handle multiple nodes as part of an end-point. In addition, an application might not be able to make a runtime determination about which cluster node is currently the master. Thus, it may be important that a private IP address provided as part of an end-point "always" points to the "current master" in the system. This also implies that during failover scenarios, the system should make sure that end-point is connected to the newly "promoted master" as quickly as possible so that the availability of the service is not impacted.

Figure 4:
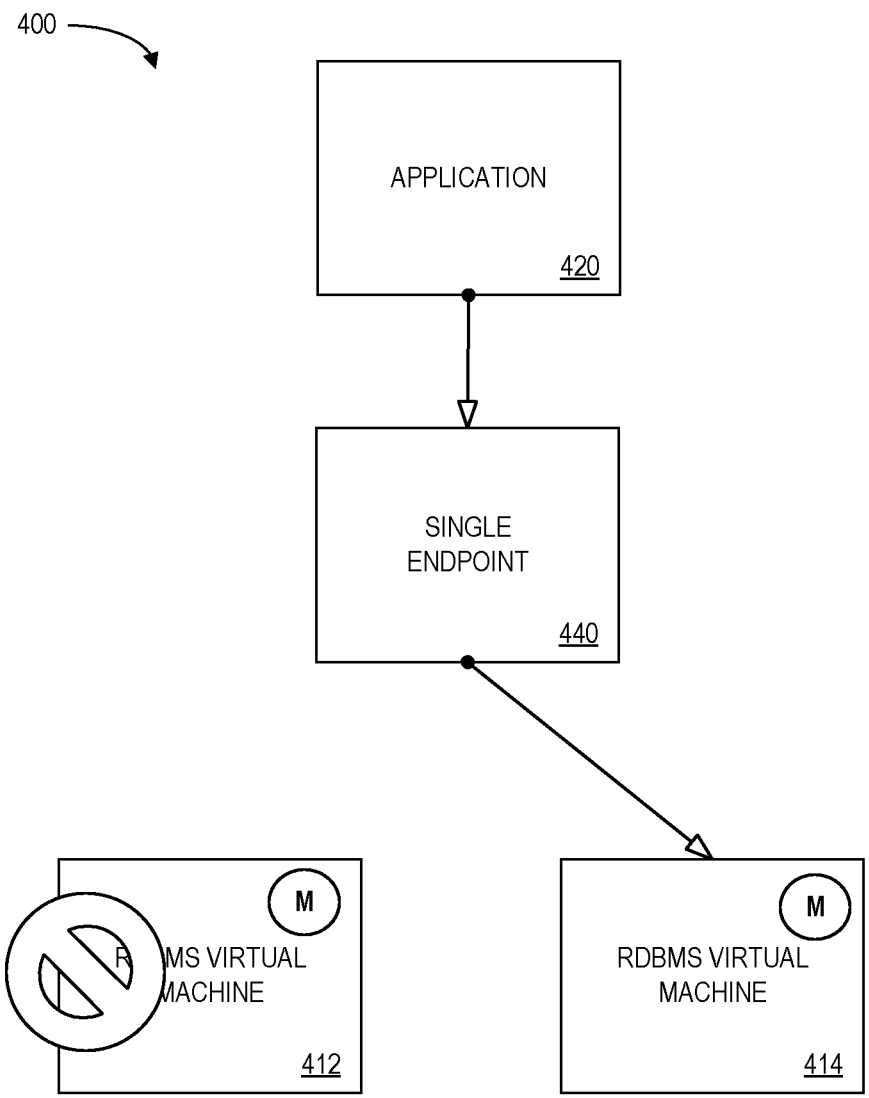
FIG. 4 illustrates an RDBMS-as-a-service with a single endpoint after a master node failure according to some embodiments.

FIG. 4 illustrates 400 an RDBMS-as-a-service with a single endpoint 430 after a master node 412 failure according to some embodiments. In this case, the other RDBMS VM 414 has been promoted to "master" (as illustrated by the "M" in FIG. 4), and the single endpoint 430 now automatically connects an application 420 to that VM 414. Note that a PostgreSQL as a service in a cloud platform might be offered for different IaaS providers (e.g., GCP, AZURE, AWS, and Openstack) and high availability solutions may be optimized to make use of the features each IaaS provider. This HA approach/technique may be followed in each hyperscale provider and developed in an efficient way. In this context, a novel, systematic and efficient approach to provide a highly available PostgreSQL as a service in a cloud platform (e.g., AZURE and GCP) is described.

Figure 5:
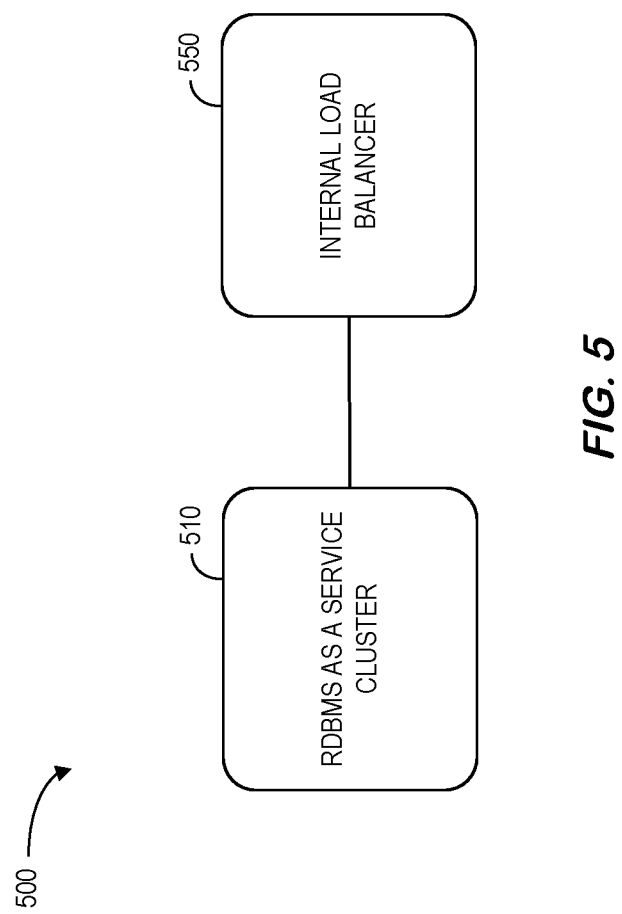
FIG. 5 is a high-level system architecture in accordance with some embodiments.

To provide improved high availability for a RDBMS as a service in a cloud-based computing environment in a secure, automatic, and accurate manner, FIG. 5 is a high-level system 500 architecture in accordance with some embodiments. The system 500 includes a RDBMS as a service cluster 510 and an internal load balancer 550. As used herein, devices, including those associated with the system 500 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The RDBMS as a service cluster 510 may store information into and/or retrieve information from various data stores, which may be locally stored or reside remote from the RDBMS as a service cluster 510. Although a single RDBMS as a service cluster 510 and internal load balancer 550 are shown in FIG. 5, any number of such devices may be included. Moreover, various devices described herein might be combined according to embodiments of the present invention. For example, in some embodiments, the RDBMS as a service cluster 510 and the internal load balancer 550 might comprise a single apparatus. The system 500 functions may be performed by a constellation of networked apparatuses, such as in a distributed processing or cloud-based architecture.

A user may access the system 500 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 500

Figure 6:
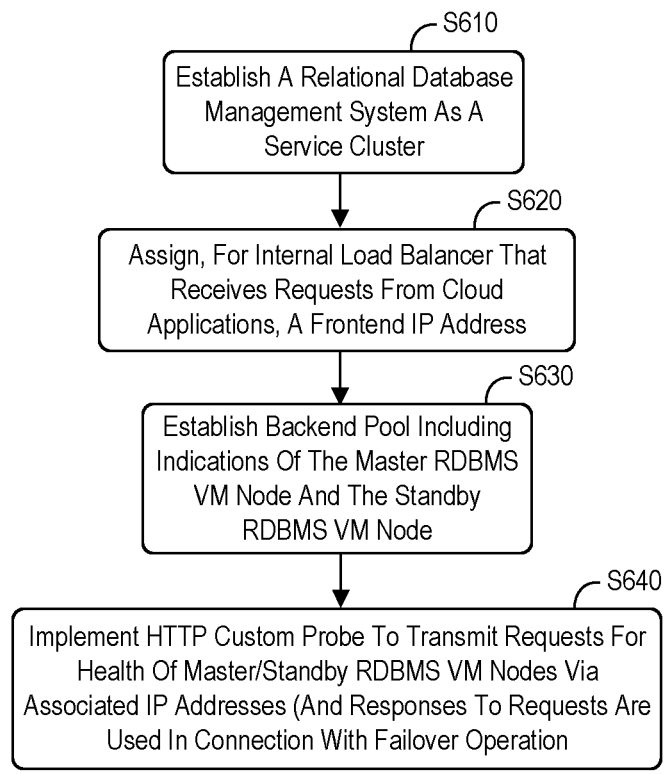
FIG. 6 is a method according to some embodiments.

FIG. 6 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S610, the system may establish a RDBMS as a service cluster. The RDBMS may include, for example: (i) a master RDBMS VM node associated with an IP address, (ii) a standby RDBMS VM node associated with an IP address, and (iii) n controller VM nodes each associated with an IP address (and n may be an integer greater than 1). At S620, the system may assign, for an internal load balancer that receives requests from cloud applications, a frontend IP address different than the RDBMS IP addresses and controller VM IP addresses. At S630, the system may establish a backend pool including indications of the master RDBMS VM node and the standby RDBMS VM node. At S640, the system may implement a HTTP custom probe to transmit requests for the health of the master RDBMS VM node and the standby RDBMS VM node via the associated IP addresses. Moreover, responses to the requests are used in connection with a failover operation.

Figure 7:
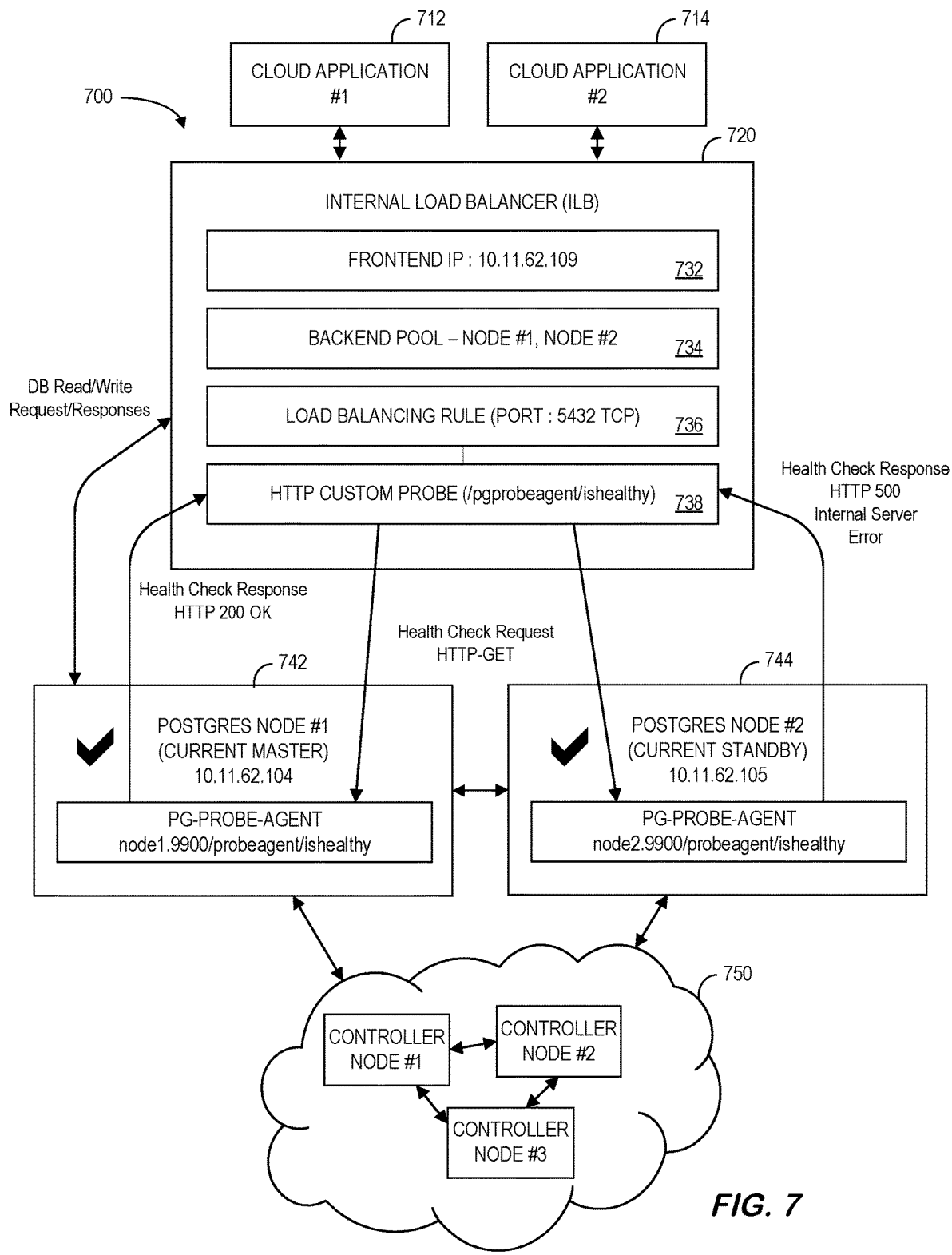
FIGS. 7 through 11 illustrate an example of a RDBMS-as-a-service system failover according to some embodiments.

Note that several resources may need to work in tandem to achieve high availability in PostgreSQL as a service. For example, when a cluster is created, each of the VMs in the cluster may be assigned a private IP address (that is, five 5 IP addresses will be used by one service instance cluster). In addition, a sixth IP address is reserved during the creation of the cluster. FIGS. 7 through 11 illustrate an example of a RDBMS-as-a-service system failover according to some embodiments. In particular, FIG. 7 illustrates a system 700 before a failover. One or more cloud applications 712, 714 access PostgreSQL nodes 742, 744 via an internal load balancer 720. As previously described, the PostgreSQL nodes 742, 744 are supported by three controller nodes executing in a cloud environment 750.

The internal load balancer 720 may comprise a component responsible for balancing the load on the cluster. The load balancing is done only on the internal (private) nodes in the cluster. An internal load balancer 720 may choose to balance the load among the nodes attached to it in different ways. It may balance the load on the basis of: a number of requests being serviced; a number of requests serviced so far; a round robin basis; and/or various performance indicators (e.g., CPU utilization, network traffic, memory size, etc.) of the nodes attached. The internal load balancer 720 might be associated with a frontend IP address 732, a backend pool 734, a load balancing rule 736, and an HTTP custom probe 738. The sixth private IP address that was reserved for the cluster is assigned to the internal load balancer 720 as the frontend IP 732. Thus, the internal load balancer 720 can be accessed using this sixth IP address (e.g., 10.11.62.109 in the example of FIG. 7).

The backend pool 734 may comprise a resource representing the set of nodes/VMs attached to the internal load balancer 720 (e.g., node #1 742 and node #2 744). All of the nodes to which a request might be forwarded are associated with the backend pool 734. For every internal load balancer 720, one backend pool 734 is created (e.g., and PostgreSQL master VM 742 and standby VM 744 are attached). Note that the PostgreSQL VMs 742, 744 (master and standby) run a PostgreSQL service in a defined port (e.g., port 5432) within the VM.

The load balancing rule 736 may be created and associated with the load internal balancer 720. The load balancing rule 736 is a rule which dictates where to forward traffic received in the frontend IP address 732 and port. In this example, the rule dictates that any inbound requests in the frontend IP address 732 and a pre-configured port (which may or may not be same as that of PostgreSQL process port) should be forwarded to the backend pool 734. At this point, all inbound requests would be forwarded to one of the PostgreSQL VMs 742, 744. However, the system also needs to make sure that inbound requests at the sixth IP address are only forwarded to PostgreSQL master VM 742.

Typically, the internal load balancer 720 will assume that VMs associated with the backend pool 734 are available for request processing. If a certain node fails to service a request for any reason, the internal load balancer 720 might choose to not send further requests to that node for a pre-determined period of time. In another embodiment, a load balancing strategy may involve checking the health status of the VMs in the backend pool 734 using heartbeat technique over well-known ports exposed in the VMs. In this case, the system may make use of this feature (and override it when appropriate) as follows.

A custom health check service may be exposed in each of the PostgreSQL VMs 742, 744. The internal load balancer 720 associated with the cluster is reconfigured to hit the custom health check service instead of well-known ports. In another embodiment, traffic that hits the internal load balancer 720 health check port is forwarded to custom health check service port.

The internal load balancer 720 checks the health status of the VMs 742, 744 during regular (pre-configured) intervals of time. The call may then be forwarded to the custom health check service in the VMs 742, 744 and the health check service invokes a PostgreSQL service running in that VM and identifies an "execution mode" (whether a given PostgreSQL node is executing as a "master" or "standby" node). If the node is running in master mode, then a "200 OK" message is sent as response by the custom health check service to the internal load balancer 720. If the node is running in standby mode, then a "500 Internal Server Error" HTTP code is sent as a response by the custom health check service to the internal load balancer 720.

When the internal load balancer 720 receives 200 OK HTTP Code for a pre-configured consecutive number of times (e.g., a healthy_count_threshold), it marks the node as "healthy" and that node will be used to service inbound requests in the frontend IP address 732. When the internal load balancer 720 receives 500 Internal Server Error HTTP Code for a pre-configured consecutive number of times (e.g., an unhealthy_count_threshold), it marks the node as "unhealthy" and that node will not be used to service inbound requests in the frontend IP address 732. In this way, the system 700 may ensure that any inbound requests at the frontend IP address 732 is always serviced by the current master in the cluster.

In order to make a service highly available, several cases which could result in failures may be considered and handled appropriately so that downtime is within an SLA. A near-Zero downtime agreement may dictate, for example, that the failover operations to be finished in under 30 seconds. Some of the various failure scenarios might include:
  an unplanned failure (e.g., due to unplanned events like VM failures or deletion, network failures etc.);
  a planned shutdown (e.g., due to planned updates of software within PostgreSQL VMs);
  a planned shutdown (e.g., due to planned updates or recreation of VMs to update a VM image to a newer version); and
  an unplanned failure (e.g., due to process failures).

With respect to a high availability failover algorithm for unplanned failures, note that when a service instance is created, a cluster with two PostgreSQL VMs and three controller nodes are spawned and each of the VMs in the cluster is assigned a private IP address. The controller nodes may be responsible for detecting any failures in a PostgreSQL master node, and each of the three controller nodes may be deployed in a different availability zone (making them resilient to any availability zone failures). Note that an odd number of controller nodes may be employed to ensure that a consensus can be formed between them. Moreover, each cluster may be comprised of separate set of controller nodes to make sure that any controller node failures does not impact any other cluster. In another embodiment, a pool of controller nodes may be created upfront and a random set of three controller nodes may be associated to each cluster (these sets of controller nodes can then be shared among multiple clusters to reduce operational costs of VMs). In some embodiments, a consensus formation process among controller nodes is used to detect failures. The controller nodes could make use of Commercial Off-The Shelf ("COTS") software, such as PGPOOL or may use a custom submodule developed to identify failures.

According to some embodiments, the controller nodes connect to a PostgreSQL service running in the PostgreSQL nodes at pre-configured intervals (e.g., a health_check_period of time) to perform a health check for the node. The controller nodes may also keep track of the replication lag between the PostgreSQL master and standby nodes during pre-configured intervals of time. Note that the controller nodes within the cluster itself may execute in unison with each other. Moreover, whenever an unplanned failure occurs, the health check performed by the controller node fails. The controller node then tries to re-connect to the PostgreSQL node after pre-configured period (e.g., a connect_retry_interval of time) with a pre-defined "connect_timeout" period. The controller node may try to perform health checks for a pre-defined number of times (e.g., an unhealthy_count) before it marks that node as failed. If the controller is unable to connect as in accordance with this logic and time periods, the node is marked as failed. After the invocations of custom health check service is performed, the internal load balancer 720 gets disrupted as well. It may be also seen that the PostgreSQL standby node is disconnected from the master node.

Figure 8:
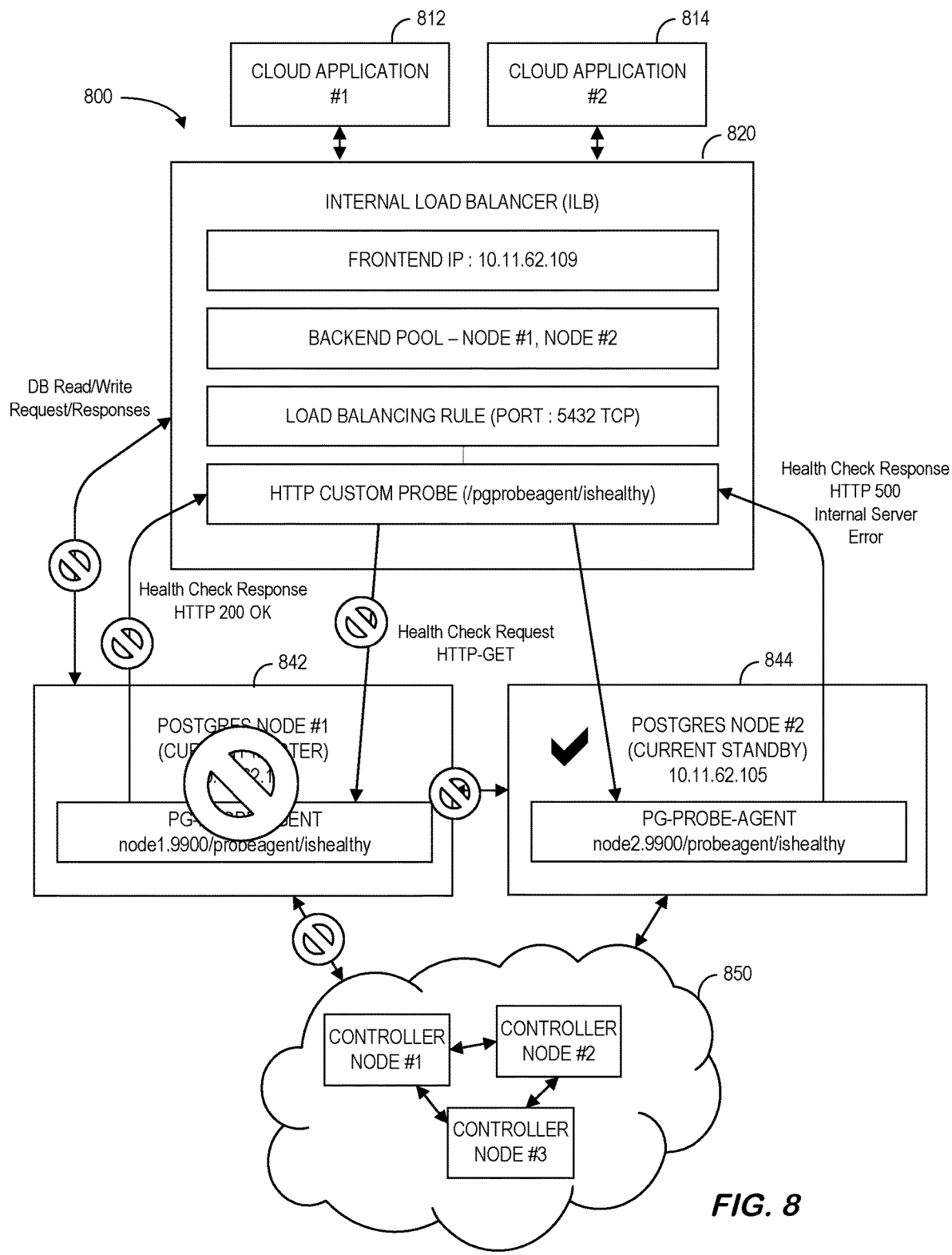

FIG. 8 illustrates a system 800 when failover begins. One or more cloud applications 812, 814 access PostgreSQL nodes 842, 844 via an internal load balancer 820. As previously described, the PostgreSQL nodes 842, 844 are supported by three controller nodes executing in a cloud environment 850. The current master node 842 has failed while the current standby node 844 remains operational.

Note that a controller node may initiate a call to a failover handler service, and a flag called "induced_failover" may imply that the failover circumstance was induced (e.g., either as a part of random functional test or an operator planned activity in other dependent modules). The failover handler service may check whether or not the "induced_failover" flag is set. If it is set, then the failover operation is aborted, otherwise the failover handler service goes ahead with the failover operation. The controller node determines to arrive at a consensus about whether the PostgreSQL master 842 is actually failed. To achieve this, the controller node again connects to current PostgreSQL master 842 and performs a health check. The controller node also spawns multiple threads which send a request to other two controller nodes (e.g., a request to perform a health check on the current PostgreSQL master node 842) and return a response as appropriate. Each of the other two controller nodes (after identifying the appropriate response), send a message back to the controller node. The controller node evaluates the two responses and identifies if two or more controller nodes form a consensus to perform the failover. If so, the failover handler service goes ahead with the failover, otherwise the failover operation is aborted.

The controller node may also make a determination of replication-lag between the master and standby PostgreSQL nodes 842, 844. A replication-lag of zero means that all data from the master PostgreSQL node 842 has been successfully synchronized with the standby node 844. A non-zero value indicates the presence of a lag (and thus potential data loss). According to some embodiments, a controller node checks a "zero_dataloss-enforced" flag. If the flag is set to true for a given instance, it implies that data loss cannot be tolerated. If the flag is set and the replication-lag is a non-zero value, then the failover operation is aborted and respective monitors and alerting mechanisms are invoked. If the flag is set and the replication-lag is zero, then the failover handler service goes ahead with the failover operation. If the flag is not set, then the replication-lag check can be skipped (and the failover handler service proceeds regardless of data loss).

The failover handler service may then initiate a Stop Other Node ("SON") operation. During the SON operation, the current faulty PostgreSQL master node 842 is stopped at by one of the controller nodes. The controller node may choose for a "hard VM restart" or "forceful VM recreation," depending on the nature and severity of the fault identified in the PostgreSQL master VM node 842. During a forceful VM recreation, the VM is recreated and the old disk is attached back to the VM. The necessary packages and code may then be compiled and deployed into the resurrected VM and service can be restarted. VM resurrection is typically helpful when there is corruption in the code, binaries etc. During a "hard VM restart," the faulty VM is simply restarted which involves restart of the service after VM boot up sequence.

Figure 9:
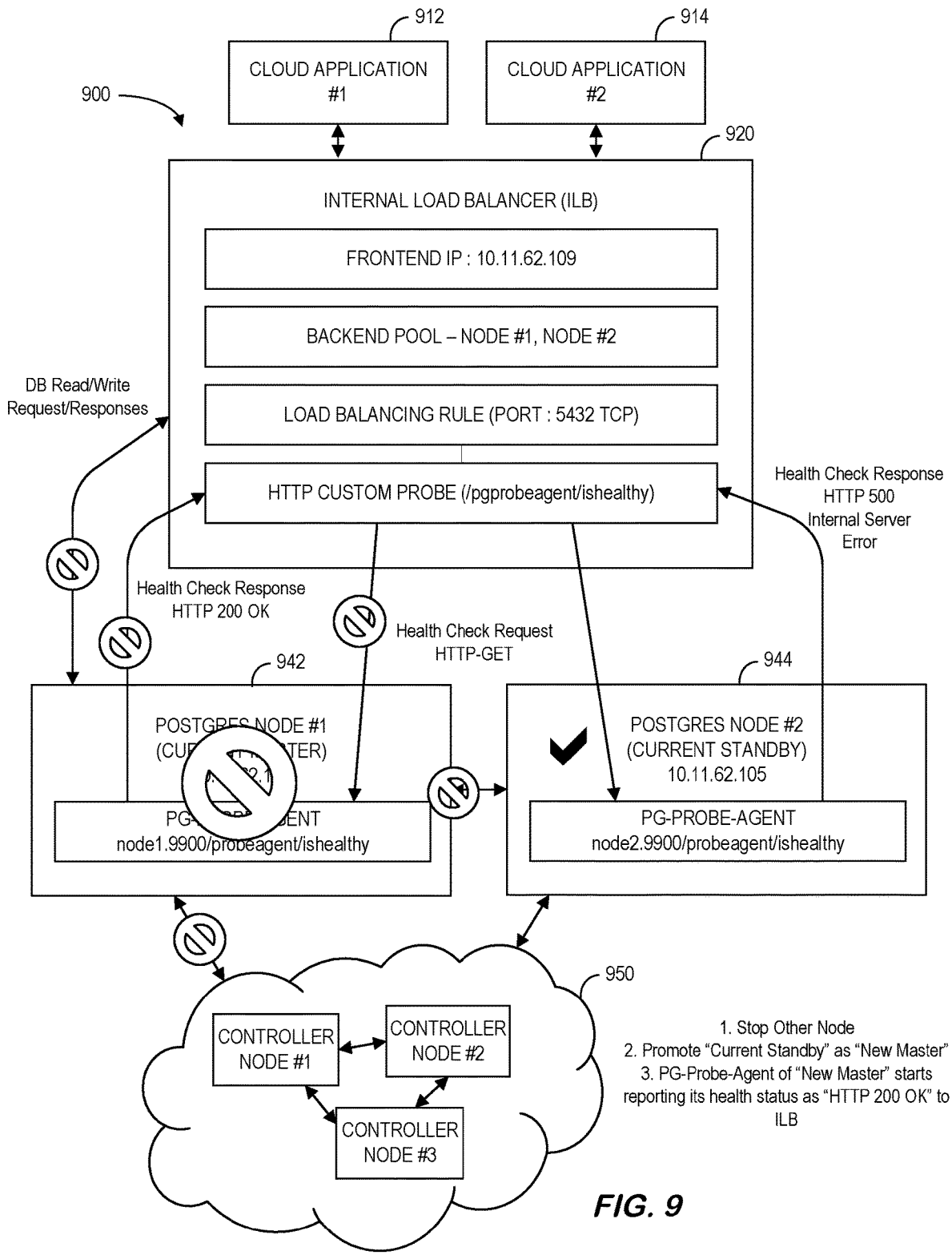

FIG. 9 illustrates a system 900 when failover begins. One or more cloud applications 912, 914 access PostgreSQL nodes 942, 944 via an internal load balancer 920. As previously described, the PostgreSQL nodes 942, 944 are supported by three controller nodes executing in a cloud environment 950. The current master node 942 has failed while the current standby node 944 remains operational. Moreover, the controller nodes have invoked a SON operation to disable/restart the original master node 942.

A controller may also perform the promotion of current PostgreSQL standby node 944 to the master state. According to some embodiments, a replication slot is created on the current PostgreSQL standby node 944 to enable replication from this node. Moreover, a trigger file may also be touched that intimates a PostgreSQL process is about change to the master role. When the current standby node 944 is promoted to master, a custom health service running in that node may make a determination that running "mode" of the node has changed and start reporting "200 OK" instead of "500 Internal Server Error" upon subsequent invocations by the internal load balancer 920 service.

Figure 10:
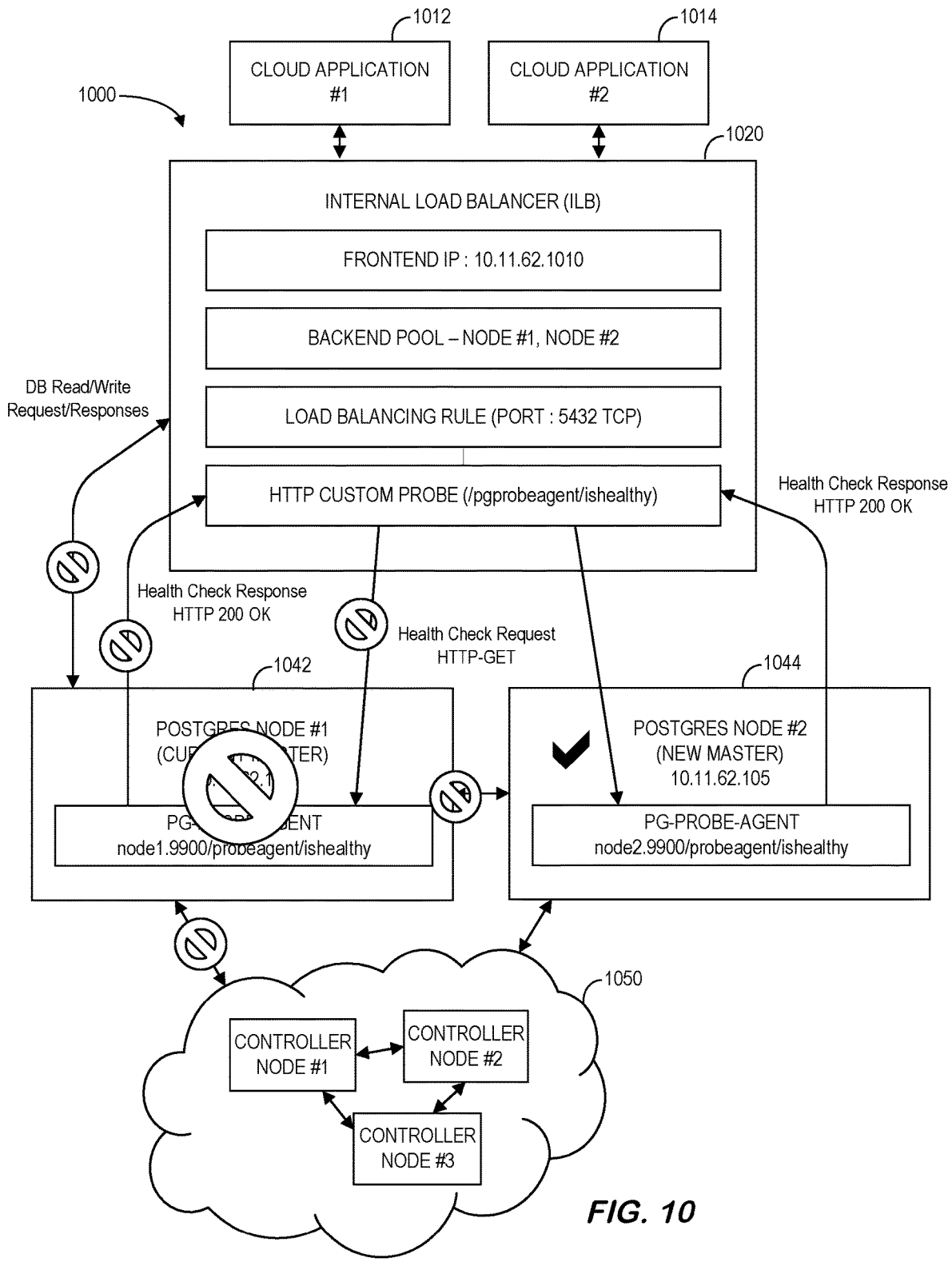
Figure 11:
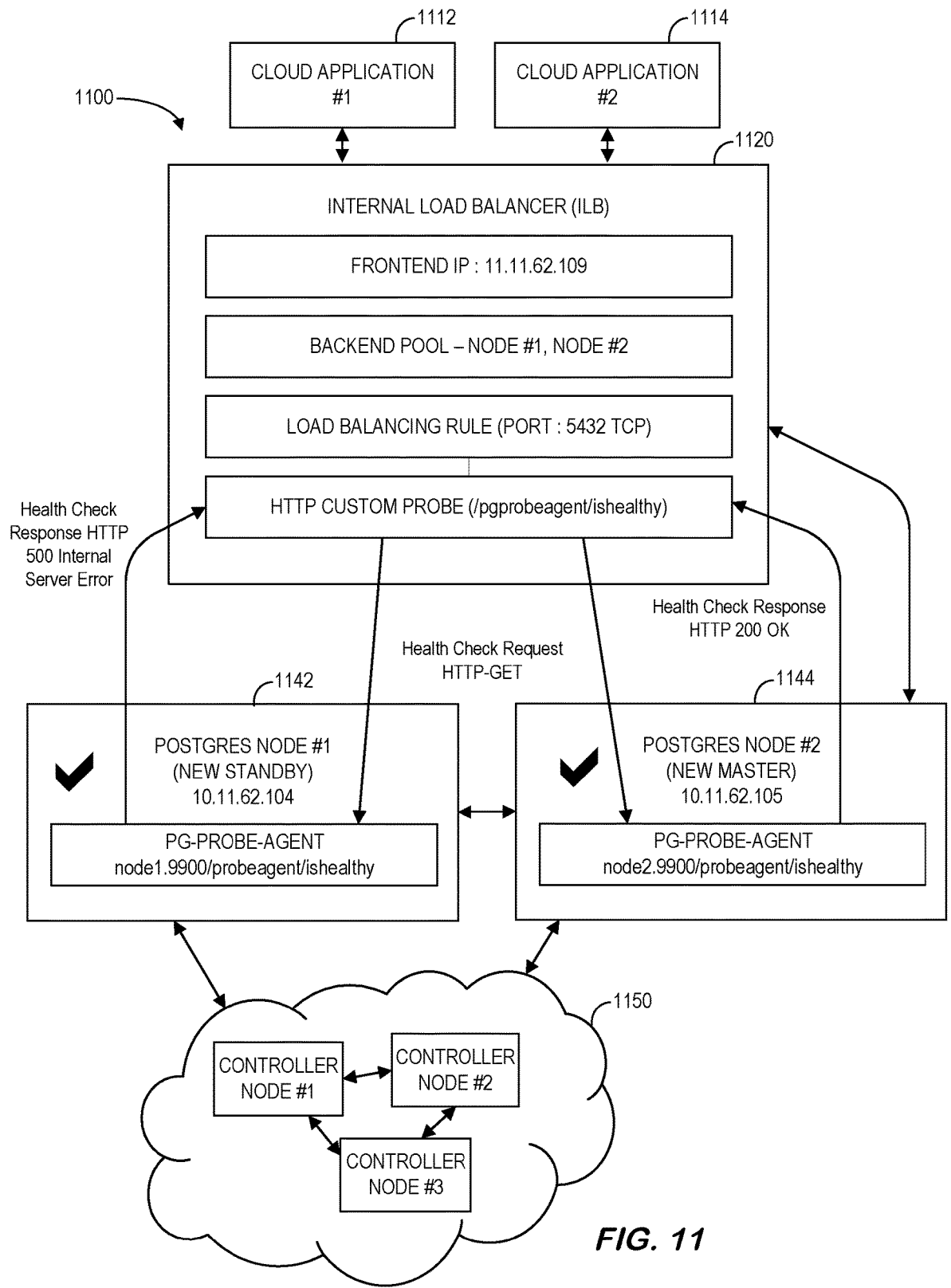

This is illustrated 1000 in FIG. 10 where one or more cloud applications 1012, 1014 access PostgreSQL nodes 1042, 1044 via an internal load balancer 1020. As previously described, the PostgreSQL nodes 1042, 1044 are supported by three controller nodes executing in a cloud environment 1050. The old master node 1042 has failed and the other node 1044 has been made the new master. The internal load balancer 1020 service keeps checking the health status during pre-configured intervals of time and makes a determination that the current node 1044 is healthy after a pre-determined number (healthy_count_threshold) of health checks are successfully passed. Once the current node 1044 (the newly promoted PostgreSQL master) is marked as healthy, all inbound requests from cloud applications 1012, 1014 are forwarded to that node.

Note that the SON operation in the meanwhile is being performed on the old master PostgreSQL VM 1042. During start-up of the old PostgreSQL master node 1042, a determination is made to see if a master is already present. In this case, an identification is made that a master PostgreSQL node 1044 is already present. As a result, the SON-ed node 1042 switches the running mode from master to standby mode. Moreover, the SON-ed node may start replicating the data from the new PostgreSQL master node 1044. Once the replication is complete, the SON-ed node 1042 starts to function as the standby node in the cluster. This is illustrated 1100 in FIG. 11 where one or more cloud applications 1112, 1114 access PostgreSQL nodes 1142, 1144 via an internal load balancer 1120. As previously described, the PostgreSQL nodes 1142, 1144 are supported by three controller nodes executing in a cloud environment 1150. The new master node 1144 is receiving inbound requests and the other node 1142 is now the new "standby" node.

At any point in this process, when a failover operation is aborted, the controller node may update the monitoring modules in the system 1100 with appropriate information. Alerting subsystems may be notified about the problem and necessary action may be taken by an operator to mitigate such rarest of the rare scenarios.

Figure 12:
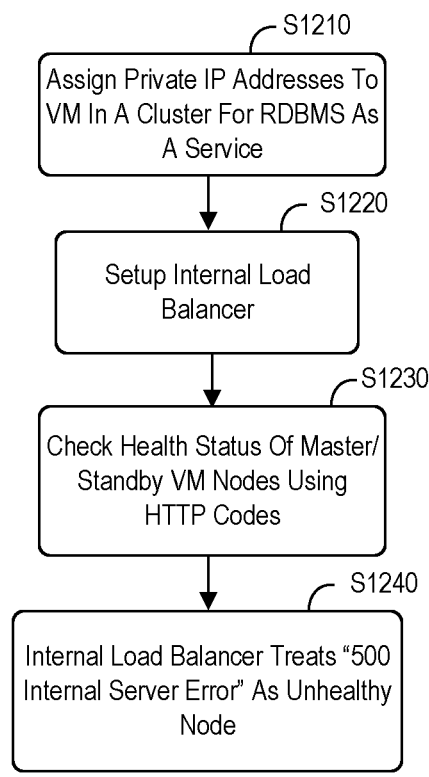
FIG. 12 is a high availability RDBMS-as-a-service method in accordance with some embodiments.

FIG. 12 is a high availability RDBMS-as-a-service method in accordance with some embodiments. At S1210, the system may assign a private IP address to a VM in a cluster for RDBMS as a service. At S1220, the system may setup an internal load balancer (e.g., with a frontend IP address, backend pool, load balancing rule, etc.). The heal status of a master and/or standby VM node may then be checked at S1230 using HTTP codes. At S1240, the internal load balancer S1420 treats a 500 internal server error as an unhealthy node (and therefore will not send future requests from applications to a healthy standby node).

Figure 13:
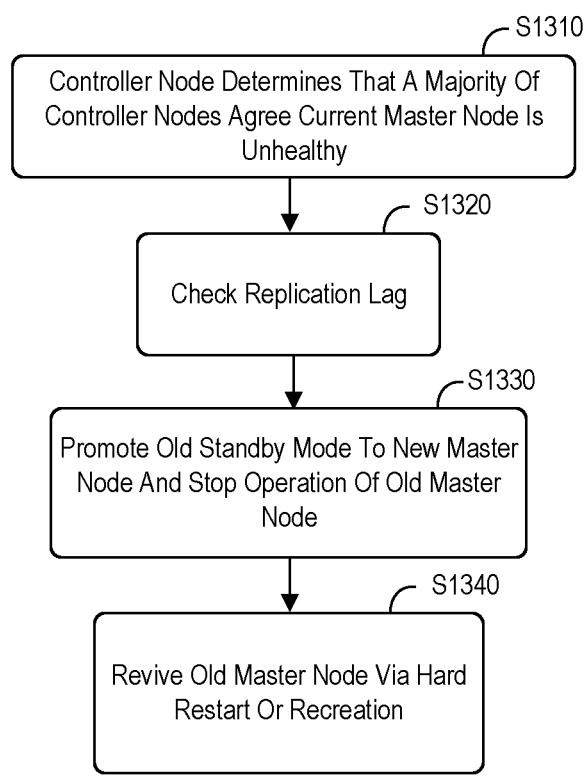
FIG. 13 is unplanned failure method in accordance with some embodiments.

FIG. 13 is unplanned failure method in accordance with some embodiments. At S1310, a controller node determines that a majority of controller nodes agree that a current master node is unhealthy. Replication lag is checked at S1320 (if the system is even concerned about replication lag), and if appropriate the old standby mode is promoted to be the new master node at S1330 and the operation of the old master node is stopped. At S1340, the system may attempt to revive the old master node using a hard restart, recreation, etc. (and the old master node will become the new standby node).

Figure 14:
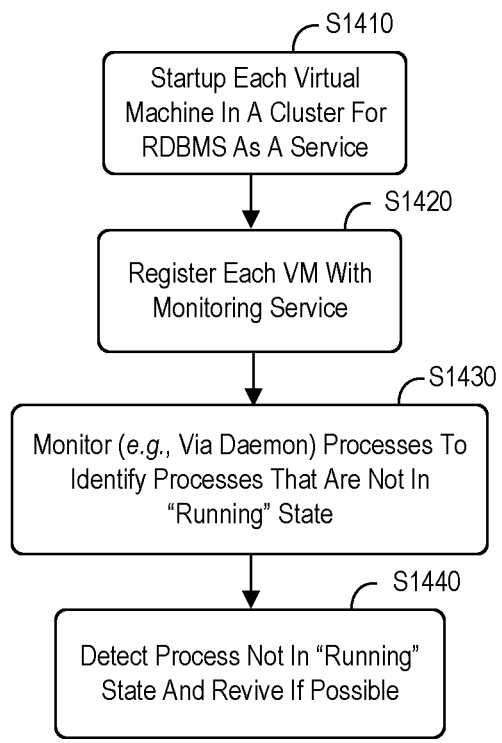
FIG. 14 is an unplanned process failure method in accordance with some embodiments.

FIG. 14 is an unplanned process failure method in accordance with some embodiments. Note that each of the processes running in all of the VMs (e.g., PostgreSQL VMs and controller nodes) needs to be fault tolerant. During startup of each VM in a cluster at S1410, each of these critical processes may be registered with a monitoring service and/or daemon such as "monit." During this registration process at S1420, necessary information about the processes and hooks to start and stop the process is provided to monitoring daemon. The monitoring daemon then monitors these processes at S1430 during pre-configured intervals of time. Whenever this monitoring identifies that one or more of the processes are not in a "running" state, the system tries to revive the process at S1440. According to some embodiments, a monitoring daemon may also store necessary information about dependencies between the processes (e.g., if process x is dependent on process y, then the monitoring daemon makes a determination that process y should be started first followed by process x). The monitoring daemon may also handle non-running processes by calling a stop hook provided during the registration followed by the start hook. If a service is restarted, then all the dependent services identified from the registration information may be identified and are restarted. Such an approach may help ensures that all cleanup activities are performed appropriately for each process and all pre-start activities are performed appropriately while starting up the process. This method may also help ensure that dependent processes are running in unison in the system. In this way, the monitoring daemon may ensure that all critical processes are in a running state at all times in the cluster.

Figure 15:
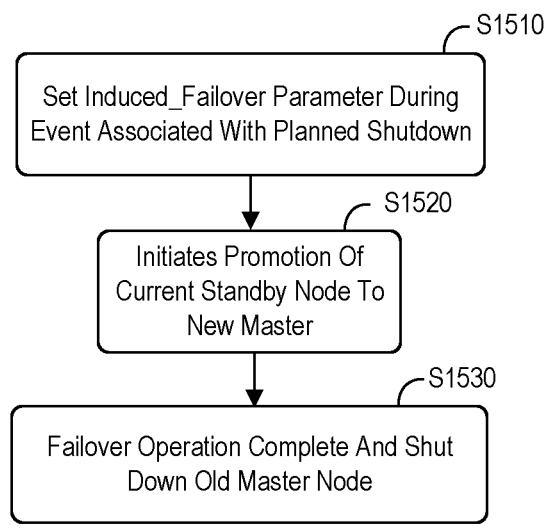
FIG. 15 is a shutdown event method in accordance with some embodiments.

FIG. 15 is a shutdown event method in accordance with some embodiments. In the case of planned shutdown events, the system is already aware of the fact that failover is bound to happen. This is done, according to some embodiments, by setting a parameter "induced_failover" during such events at S1510. When the current master PostgreSQL VM goes down, the system initiates a promotion of the current standby node at S1520. The promotion step involves creating the replication slot and creating the trigger file in the current standby node to make the PostgreSQL process aware of the promotion. Once this is done, the failover operation is completed and the current node is now safe to shut down at S1530 (because the standby node has been successfully promoted as new master PostgreSQL node). At any step during this process, if the controller node determines that master is down, it checks the "induced_failover" flag. If the flag is set, then no further operation is performed by the controller nodes (because the system understands that this is a planned shutdown that is already being handled). When the promotion is done, inbound requests are forwarded to the newly promoted master PostgreSQL VM.

Figure 16:
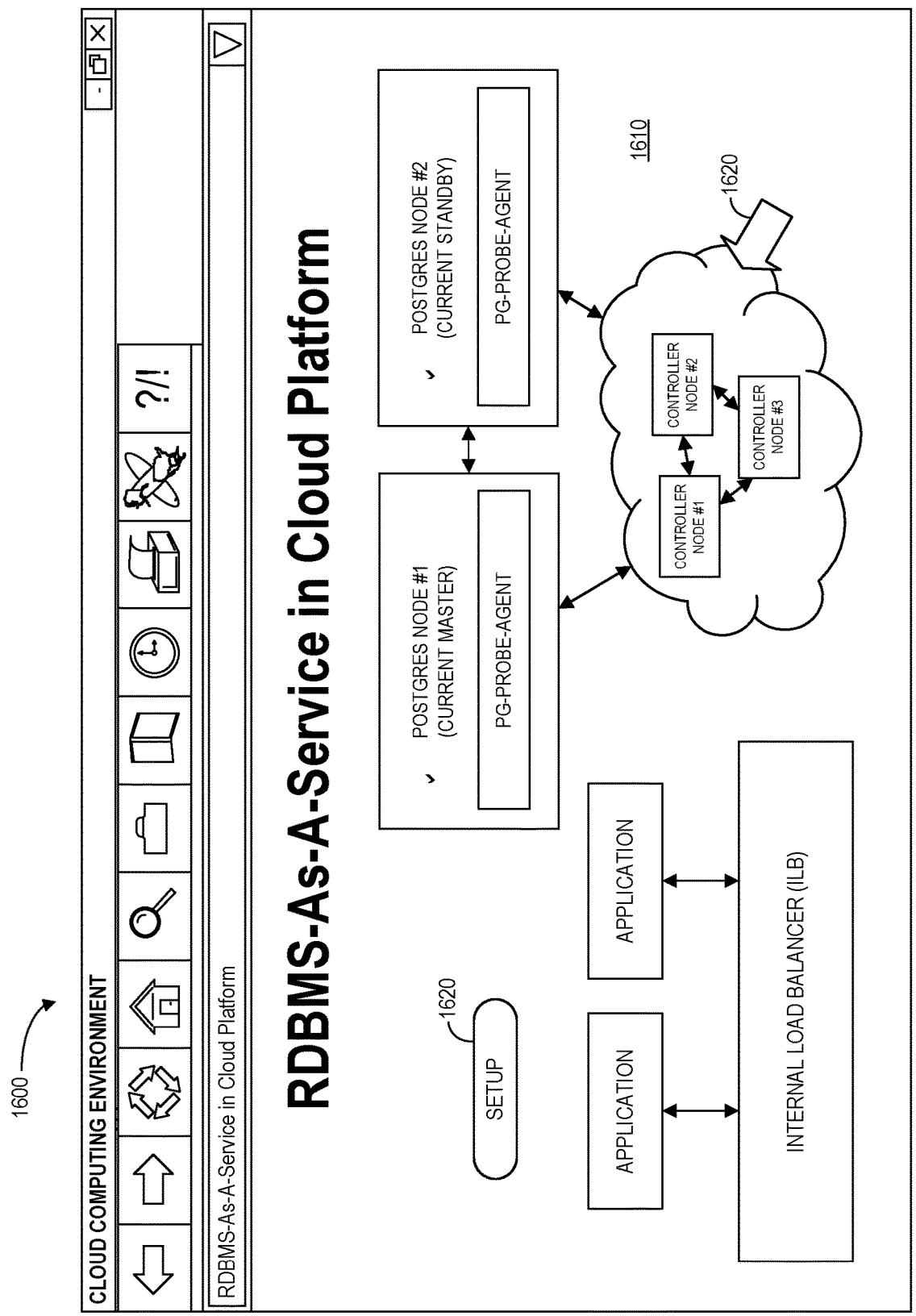
FIG. 16 is a human machine interface display according to some embodiments.

FIG. 16 is a human machine interface display 1600 in accordance with some embodiments. The display 1600 includes a graphical representation 1610 of elements of cloud-based computing environment system for RDBMS as a service implementation. Selection of an element (e.g., via a touch-screen or computer pointer 1620) may result in display of a pop-up window containing various options (e.g., to adjust rules or logic, assign various devices, etc.). The display 1600 may also include a user-selectable "Setup" icon 1620 (e.g., to configure parameters for cloud management/provisioning (e.g., to alter or adjust processes as described with respect any of the embodiments described herein)).

Figure 17:
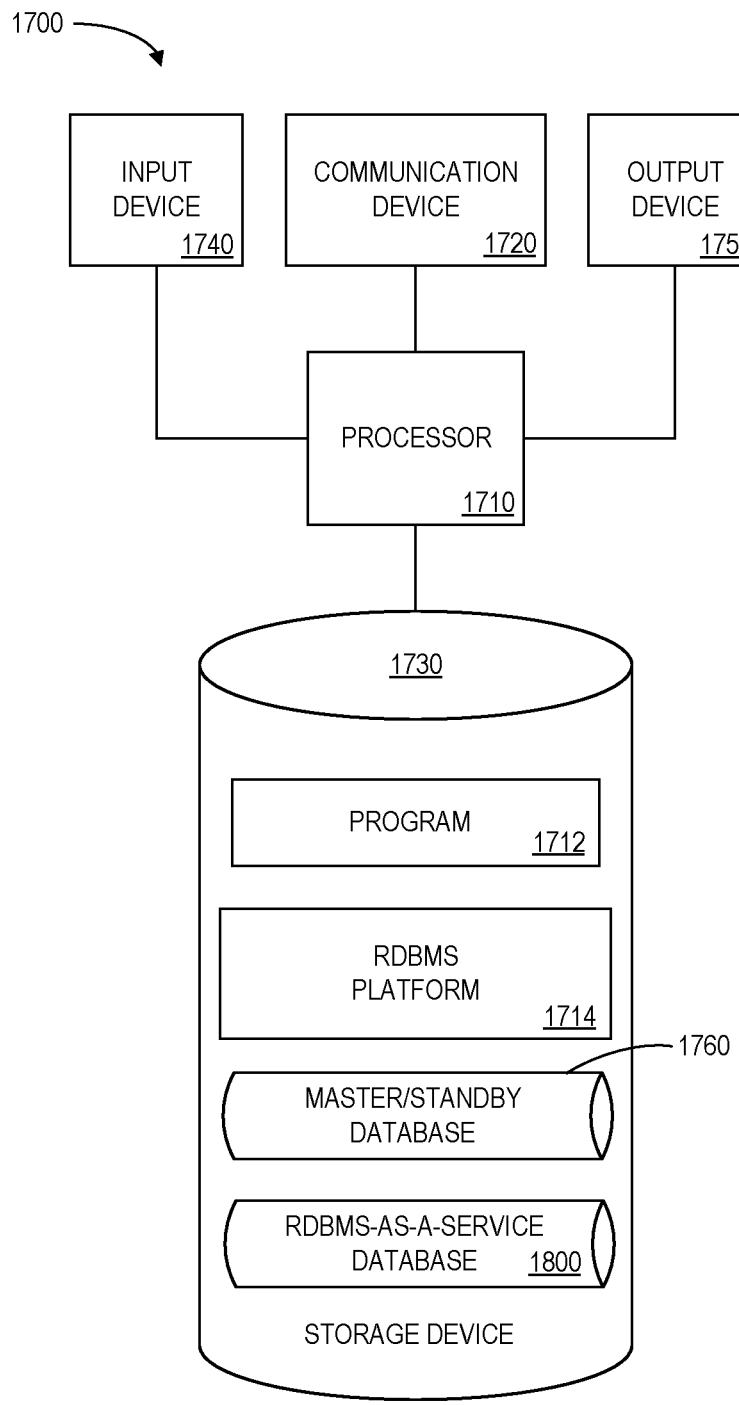
FIG. 17 is an apparatus or platform according to some embodiments.

Note that the embodiments described herein may be implemented using any number of different hardware configurations. For example, FIG. 17 is a block diagram of an apparatus or platform 1700 that may be, for example, associated with the system 200 of FIG. 2 (and/or any other system described herein). The platform 1700 comprises a processor 1710, such as one or more commercially available Central Processing Units ("CPUs") in the form of one-chip microprocessors, coupled to a communication device 1760 configured to communicate via a communication network (not shown in FIG. 17). The communication device 1760 may be used to communicate, for example, with one or more remote user platforms, cloud resource providers, etc. The platform 1700 further includes an input device 1740 (e.g., a computer mouse and/or keyboard to input rules or logic) and/an output device 1750 (e.g., a computer monitor to render a display, transmit alerts to operators when a failure cannot be corrected, and/or create data center reports). According to some embodiments, a mobile device and/or PC may be used to exchange information with the platform 1700.

The processor 1710 also communicates with a storage device 1730. The storage device 1730 can be implemented as a single database or the different components of the storage device 1730 can be distributed using multiple databases (that is, different deployment information storage options are possible). The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or RDBMS platform 1714 for controlling the processor 1710. The processor 1710 performs instructions of the programs 1712, 1714, and thereby operates in accordance with any of the embodiments described herein. For example, the processor 1710 may implement a RDBMS as a service cluster may including a master RDBMS VM node associated with an IP address and a standby RDBMS VM node associated with an IP address. The RDBMS as a service (e.g., PostgreSQL as a service) may also include n controller VM nodes each associated with an IP address. The processor 1710 may receive requests from cloud applications and include a frontend IP address different than the RDBMS IP as a service addresses and a backend pool including indications of the master RDBMS VM node and the standby RDBMS VM node. A HTTP custom probe may transmit requests for the health of the master RDBMS VM node and the standby RDBMS VM node via the associated IP addresses, and responses to the requests may be used by the processor 1710 in connection with a failover operation.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the platform 1700 from another device; or (ii) a software application or module within the platform 1700 from another software application, module, or any other source.

In some embodiments (such as the one shown in FIG. 17), the storage device 1730 further stores a master/standby database 1760 and a RDBMS as a service database 1800. An example of a database that may be used in connection with the platform 1700 will now be described in detail with respect to FIG. 18. Note that the database described herein is only one example, and additional and/or different information may be stored therein. Moreover, various databases might be split or combined in accordance with any of the embodiments described herein.

Figure 18:
FIG. 18 illustrates a web assembly database in accordance with some embodiments.

Referring to FIG. 18, a table is shown that represents the RDBMS as a service database 1800 that may be stored at the platform 1800 according to some embodiments. The table may include, for example, entries defining nodes and/or load balancers in a cluster. The table may also define fields 1802, 1804, 1806, 1808, for each of the entries. The fields 1802, 1804, 1806, 1808 may, according to some embodiments, specify: a RDBMS identifier 1802, a VM identifier 1804, a VM description 1806, and an IP address 1808. The RDBMS as a service database 1800 may be created and updated, for example, when a new RDBMS as a service is provided for an application. According to some embodiments, the RDBMS database 1800 may further store details about a frontend IP address, a backend pool, a load balancing rule, a custom probe, current health status, etc.

The RDBMS identifier 1802 might be a unique alphanumeric label or link that is associated with PostgreSQL as a service or similar service being defined for an application. The VM identifier 1804 might identify a machine to be associated with a cluster for that service (e.g., a controller node VM). The VM description 1806 might indicate if the VM is associated with a master node, standby node, controller node, etc. The IP address 1308 may be private IP address used to identify that particular VM within the cluster.

Thus, embodiments may provide high availability for a relational database management system as a service in a cloud-based computing environment in a secure, automatic, and accurate manner. Moreover, a novel, systematic, and efficient approach to provide a highly available PostgreSQL as a Service in a cloud platform (e.g., in AZURE and/or GCP) by making use of controller nodes and a novel high availability failover algorithm which may provide a near zero downtime with a minimal set of resources in a fully automated way. Such an approach may aid in managing tens of thousands of PostgreSQL service instance clusters in productive landscapes.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 19:
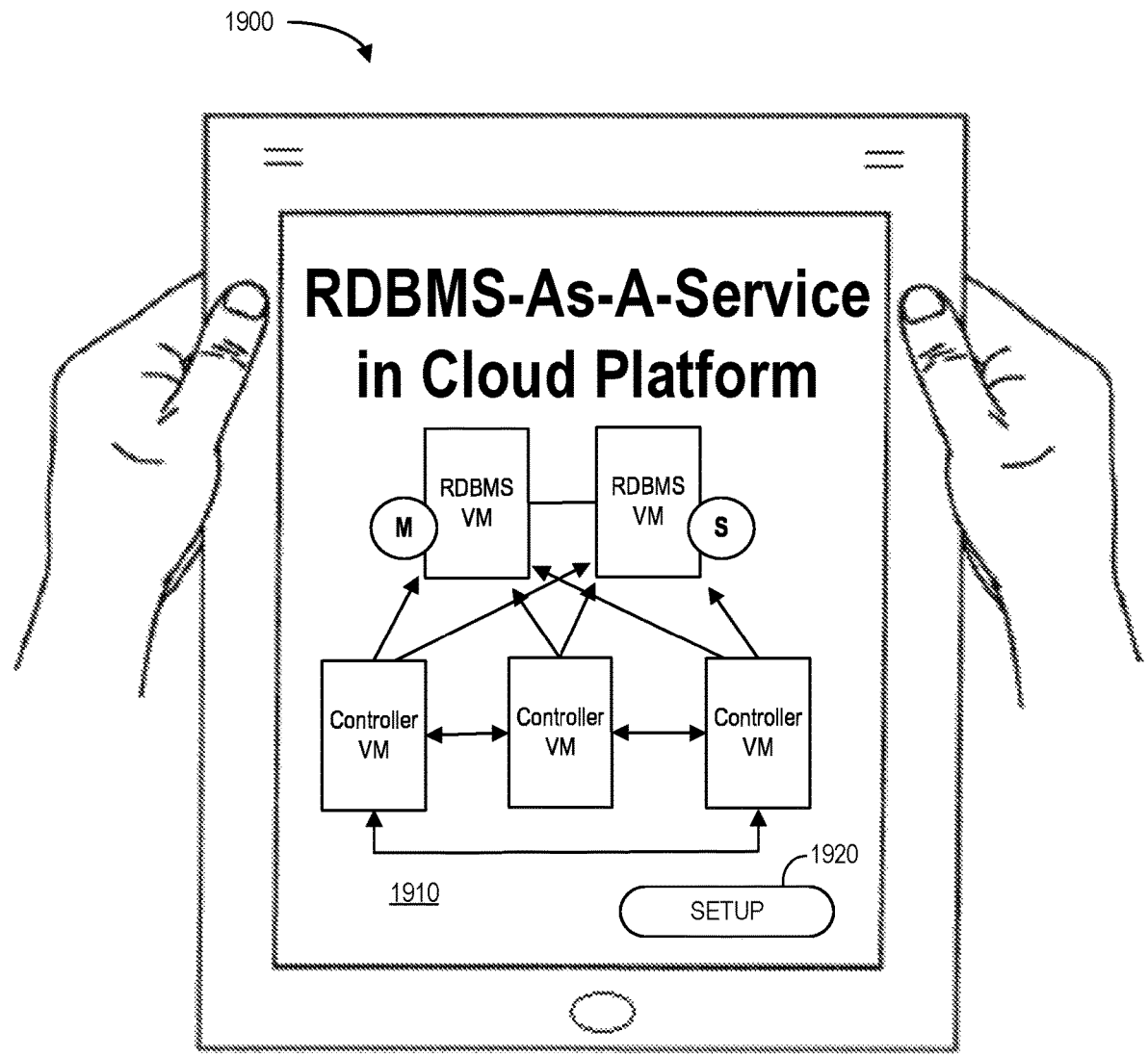
FIG. 19 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented. For example, FIG. 19 shows a tablet computer 1900 rendering a RDBMS-as-a-Service display 1910. The display 1910 may, according to some embodiments, be used to view more detailed elements about components of the system (e.g., when a graphical element is selected via a touchscreen) or to configure operation of the system (e.g., to establish new rules or logic for the system via a "Setup" icon 1920).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with a cloud-based computing environment, comprising:
  a memory storing processor-executable program code; and
  a processor to execute the processor-executable program code in order to cause the system to:
    establish a Relational Database Management System ("RDBMS") as a service cluster, including a master RDBMS Virtual Machine ("VM") node associated with an Internet Protocol ("IP") address, a standby RDBMS VM node associated with an IP address, and n controller VM nodes each associated with an IP address, where n is greater than 1;
    assign, to nodes for requests received from cloud applications, a frontend IP address different than the IP addresses associated with the master RDBMS VM node, the standby RDBMS VM node, and the n controller VM nodes;
    establish a backend pool including indications of the master RDBMS VM node and the standby RDBMS VM node; and
    transmit Hyper-Text Transfer Protocol ("HTTP") requests for a health of the master RDBMS VM node and the standby RDBMS VM node via the associated IP addresses, wherein responses to the requests are used in connection with a failover operation.

2. The system of claim 1, wherein a HTTP 200 OK response is received from a healthy master RDBMS VM node and a HTTP 500 Internal Server Error response is received from a healthy standby RDBMS VM node.

3. The system of claim 1, further comprising:
  an endpoint to route incoming requests from cloud applications, including a service endpoint, to either RDBMS VM node.

4. The system of claim 3, wherein the service endpoint includes a protocol name, a private IP address, and a port identifier.

5. The system of claim 1, wherein the assigning is based on at least one of: (i) a number of requests being serviced, (ii) a number of requests serviced so far, and (iii) a round robin basis.

6. The system of claim 1, wherein the assigning is based on a node performance indicator associated with at least one of: (i) central processor unit utilization, (ii) network traffic, and (iii) memory size.

7. The system of claim 1, wherein the n controller VM nodes comprise an odd number of controller VM nodes that communicate with each other in accordance with a heartbeat exchange protocol.

8. The system of claim 7, wherein the controller VM nodes comprise a set of nodes that is unique for the RDBMS as a service cluster.

9. The system of claim 7, wherein the controller VM nodes are associated with a pool of nodes associated with other RDBMS as a service clusters and a consensus formation process is used among controller nodes to detect failures.

10. The system of claim 7, wherein each controller VM node is associated with a different data center availability zone.

11. The system of claim 1, wherein the failover operation uses an induced failover flag.

12. The system of claim 1, wherein the failover operation uses a zero data loss flag and a replication lag determination.

13. A computer-implemented method associated with a cloud-based computing environment, comprising:
  establishing a Relational Database Management System ("RDBMS") as a service cluster, including: (i) a master RDBMS Virtual Machine ("VM") node associated with an Internet Protocol ("IP") address, (ii) a standby RDBMS VM node associated with an IP address, and (iii) n controller VM nodes each associated with an IP address, where n is greater than 1;
  assigning, to nodes for requests from cloud applications, a frontend IP address different than the IP addresses associated with the master RDBMS VM node, the standby RDBMS VM node, and the n controller VM nodes;
  establishing a backend pool including indications of the master RDBMS VM node and the standby RDBMS VM node; and transmitting Hyper-Text Transfer Protocol ("HTTP") requests for a health of the master RDBMS VM node and the standby RDBMS VM node via the associated IP addresses, wherein responses to the requests are used in connection with a failover operation.

14. The method of claim 13, wherein a HTTP 200 OK response is received from a healthy master RDBMS VM node and a HTTP 500 Internal Server Error response is received from a healthy standby RDBMS VM node.

15. The method of claim 13, further comprising:
utilizing an endpoint to route incoming requests from cloud applications, including a service endpoint, to either RDBMS VM node.

16. The method of claim 15, wherein the service endpoint includes a protocol name, a private IP address, and a port identifier.

17. A non-transitory, computer readable medium having executable instructions stored therein, the medium comprising:
instructions for establishing a Relational Database Management System ("RDBMS") as a service cluster, including: (i) a master RDBMS Virtual Machine ("VM") node associated with an Internet Protocol ("IP") address, (ii) a standby RDBMS VM node associated with an IP address, and (iii) n controller VM nodes each associated with an IP address, where n is greater than 1;
instructions for assigning, to nodes for requests received from cloud applications, a frontend IP address different than the IP addresses associated with the master RDBMS VM node, the standby RDBMS VM node, and the n controller VM nodes;
instructions for establishing a backend pool including indications of the master RDBMS VM node and the standby RDBMS VM node;
instructions for implementing a load balancing rule to dictate where to forward traffic received at the frontend IP address; and
instructions for transmitting Hyper-Text Transfer Protocol ("HTTP") requests for a health of the master RDBMS VM node and the standby RDBMS VM node via the associated IP addresses, wherein responses to the requests are used in connection with a failover operation.

18. The medium of claim 17, wherein the assigning is based on at least one of: (i) a number of requests being serviced, (ii) a number of requests serviced so far, and (iii) a round robin basis.

19. The medium of claim 17, wherein the assigning is based on a node performance indicator associated with at least one of: (i) central processor unit utilization, (ii) network traffic, and (iii) memory size.

* * * * *